April 23, 1968   O. A. YOST   3,379,186
MACHINE WITH POLYHEDRAL PISTONS AND RENEWABLE STRAIGHT SEALS
Filed Sept. 8, 1966   6 Sheets-Sheet 1
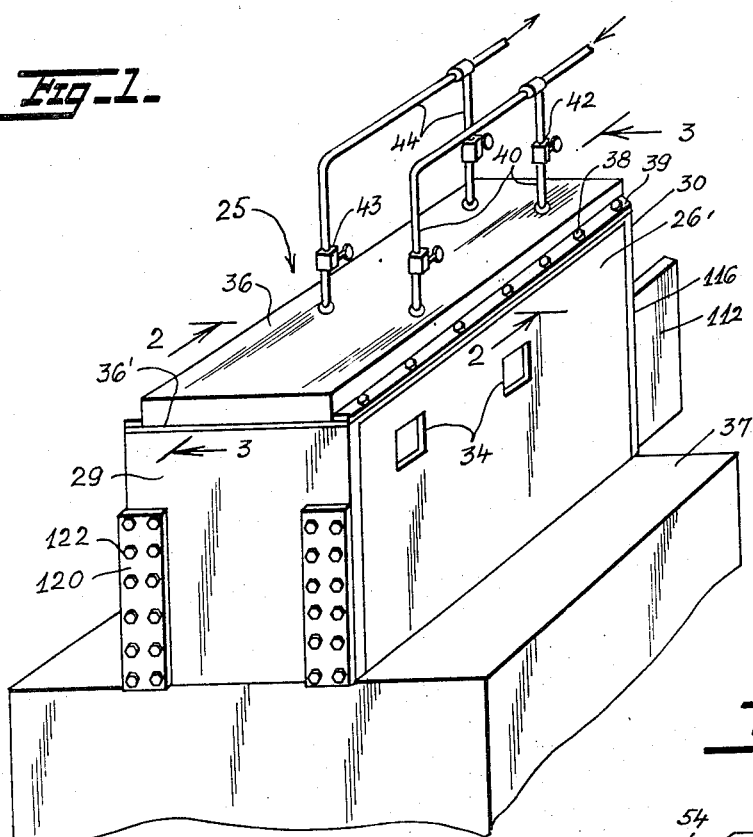
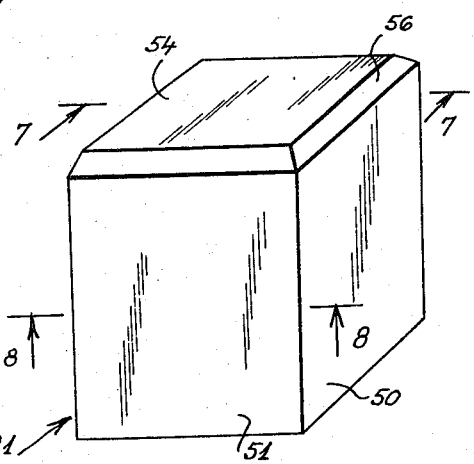
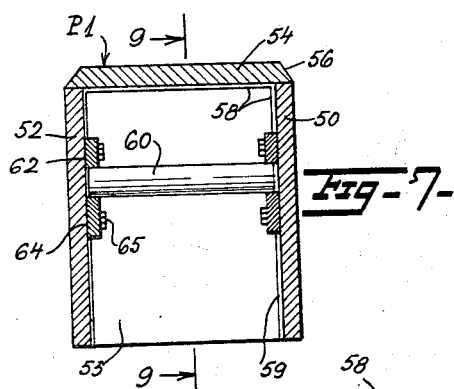
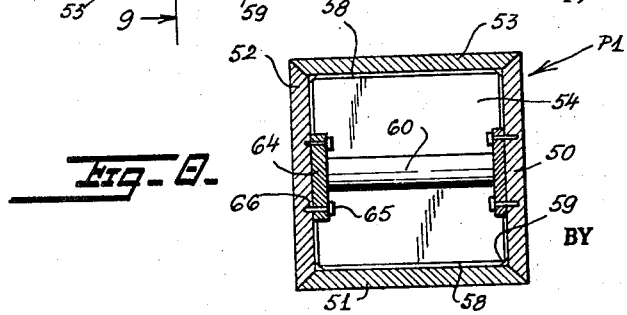
INVENTOR
Oscar A. Yost
BY Polachek & Saulsbury
ATTORNEYS April 23, 1968 O. A. YOST 3,379,186
MACHINE WITH POLYHEDRAL PISTONS AND RENEWABLE STRAIGHT SEALS
Filed Sept. 8, 1966 6 Sheets-Sheet 2

INVENTOR
Oscar A. Yost
BY Polachek & Saulsbury
ATTORNEYS

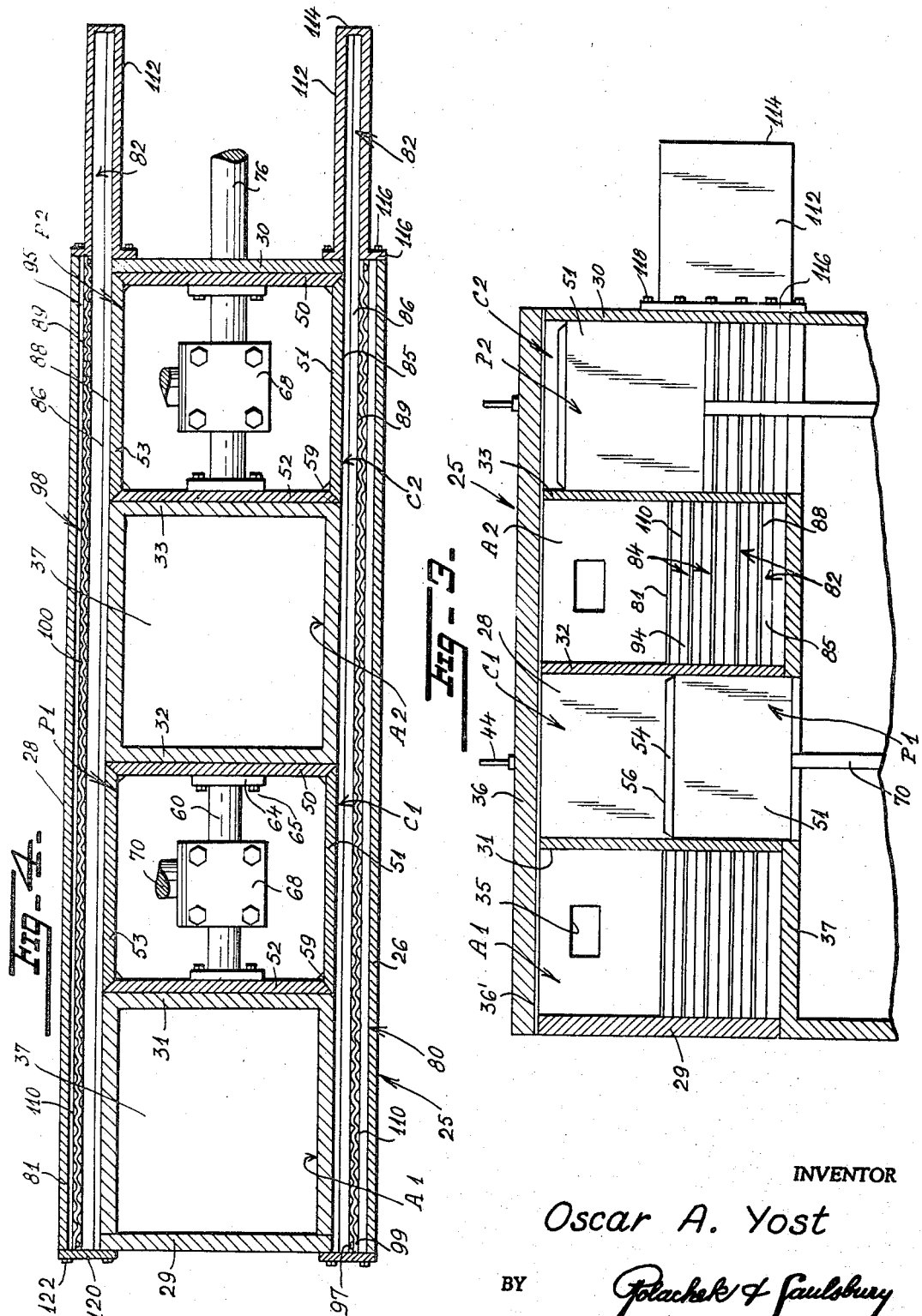

April 23, 1968   O. A. YOST   3,379,186
MACHINE WITH POLYHEDRAL PISTONS AND RENEWABLE STRAIGHT SEALS
Filed Sept. 8, 1966   6 Sheets-Sheet 4
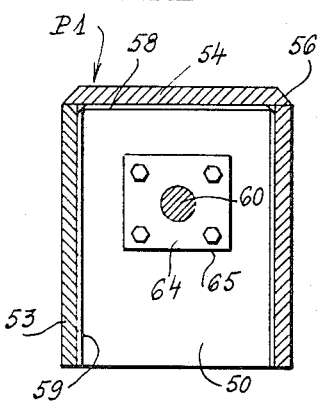
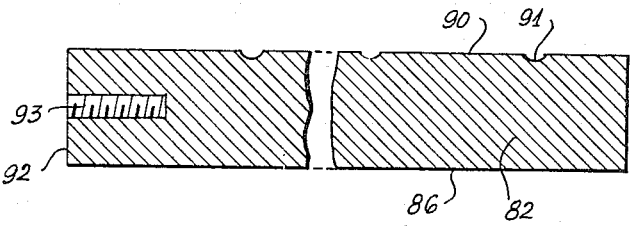
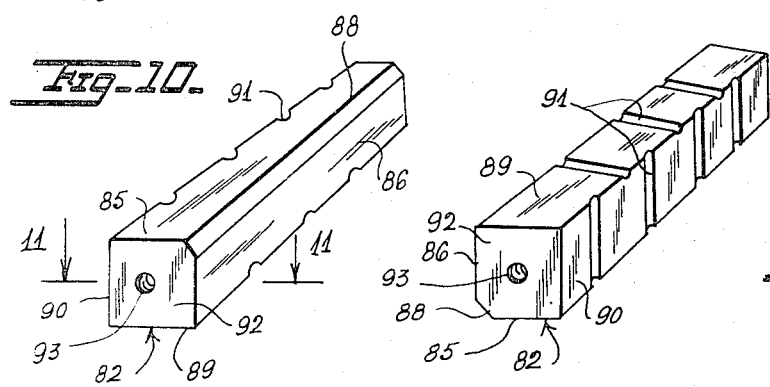
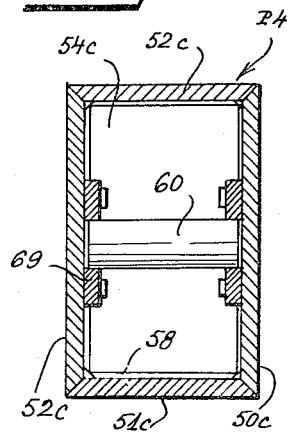
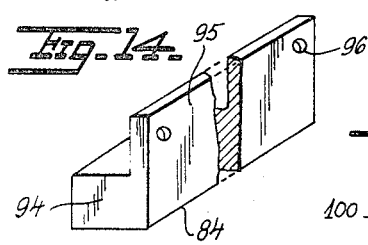
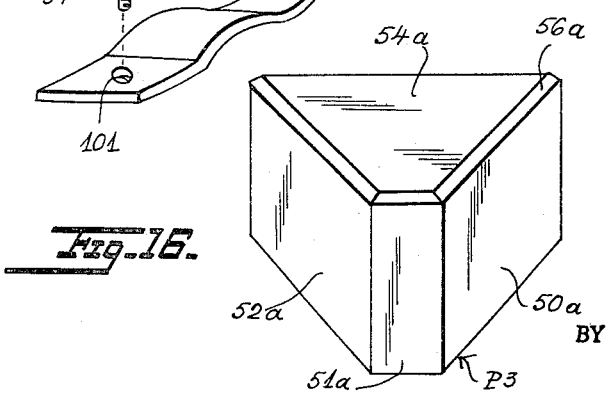
INVENTOR
Oscar A. Yost
BY
Placheck & Saulsbury
ATTORNEYS April 23, 1968     O. A. YOST     3,379,186
MACHINE WITH POLYHEDRAL PISTONS AND RENEWABLE STRAIGHT SEALS
Filed Sept. 3, 1966     6 Sheets-Sheet 5
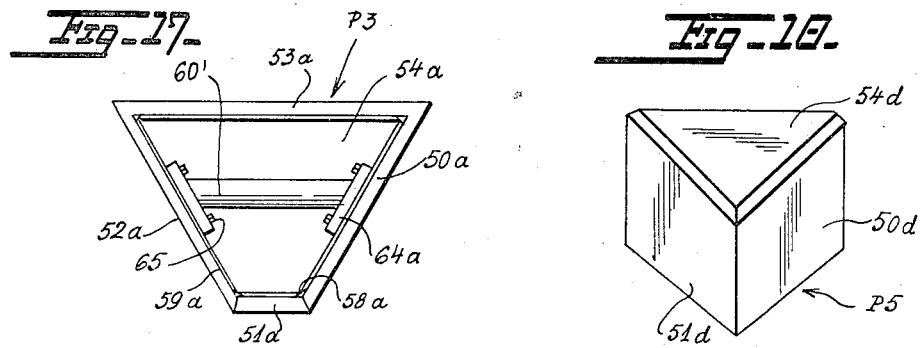
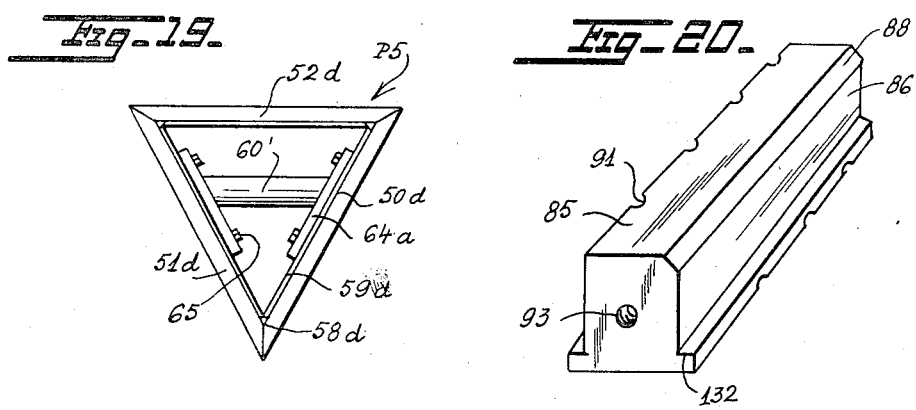
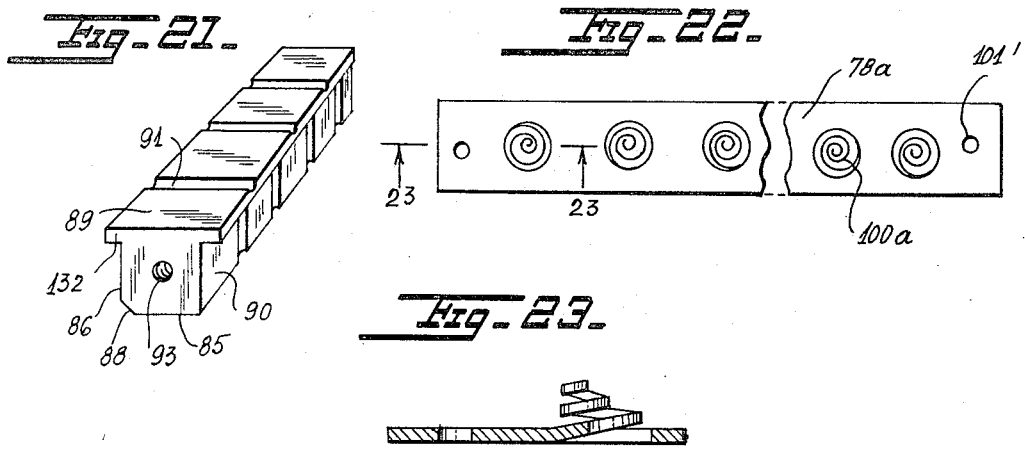
INVENTOR
Oscar A. Yost
BY Polachek & Saulsbury
ATTORNEYS April 23, 1968     O. A. YOST     3,379,186
MACHINE WITH POLYHEDRAL PISTONS AND RENEWABLE STRAIGHT SEALS
Filed Sept. 8, 1966     6 Sheets-Sheet 6

INVENTOR
Oscar A. Yost
BY Polachek & Saulsbury
ATTORNEYS

United States Patent Office 3,379,186
Patented Apr. 23, 1968

3,379,186
MACHINE WITH POLYHEDRAL PISTONS AND RENEWABLE STRAIGHT SEALS
Oscar A. Yost, 302 W. 22nd St., New York, N.Y. 10011
Filed Sept. 8, 1966, Ser. No. 577,953
18 Claims. (Cl. 123—193)

This invention relates to the art of engine construction and more particularly concerns an engine having polyhedral cylinders and pistons with straight renewable spring biased seals.

The invention is applicable to machines such as diesel, internal combustion and hydraulic engines. It is also applicable to similar types of machines such as air and gas compressors, pumps, motors, mechanical power generators, and the like. For convenience in reference the term "engine" in this specification is broadly applied to all such machines.

Heretofore it has been conventional to provide engines with cylindrical pistons in round cylinders and with expansion spring sealing rings engaged in grooves on the pistons and movable therewith. In time such pistons and cylinders wear out and the engine must be rebuilt. The pistons and piston rings must be replaced and cylinders rebored. This is a very expensive, laborious task. Even piston ring replacement alone is a difficult, costly and time consuming procedure, requiring disassembly of the engine. As a result many good engines are discarded to avoid the expense of rebuilding.

The present invention avoids the above mentioned and other difficulties and disadvantages by providing polyhedral pistons which are polygonal in cross section. The sides of the polygonal pistons are flat and the cylinders in which they work are correspondingly shaped. Straight-sided, stationary, spring biased seals are applied to one or more sides of the pistons. These seals are longitudinally movable in walls of the cylinders and are removable therefrom. The seals can be made in extra lengths so that they can be renewed at least once by longitudinally repositioning them. Replacement of seals is accomplished by sliding them longitudinally out of the engine without disassembling the engine. The seals can be replaced while the engine is running without interfering with operation of the engine. The pistons and cylinders retain their polyhedral shape.

It is therefore one object of the invention to provide an engine with at least one polyhedral hollow piston working in a similarly shaped cylinder.

A further object is to provide a polyhedral piston which can be assembled from a plurality of flat plates welded together.

Another object is to provide an engine of the character described with stationary straight seals spring biased for sealing the polyhedral pistons, and removable by sliding the seals longitudinally out of the engine.

Another object is to provide novel straight renewable seals for sealing a polyhedral piston.

Another object is to provide a novel spring structure for urging a straight seal against into contact with a flat side of a polyhedral piston.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of an engine embodying the invention, parts not relevant to the invention being broken away or omitted.

FIG. 3 is a vertical longitudinal sectional view taken on line 3—3 of FIG. 1.

FIG. 4 is a horizontal, enlarged sectional view taken on line 4—4 of FIG. 1.

FIG. 6 is a perspective view of a rectangular polyhedral piston such as used in the engine of FIGS. 1–5.

FIG. 7 and FIG. 8 are vertical and horizontal sectional views taken respectively on lines 7—7 and 8—8 of FIG. 6.

FIG. 9 is a vertical sectional view taken on line 9—9 of FIG. 7.

FIG. 10 is a perspective view of a straight seal or sealing bar such as used in the engine of FIGS. 1–5.

FIG. 11 is an enlarged longitudinal sectional view taken on line 11—11 of FIG. 10, part being broken away.

FIG. 12 is a perspective view of the straight seal of FIG. 10 with the seal shown rotated 180° from the position of FIG. 10.

FIG. 13 is a perspective view, with part broken away of a leaf spring employed in the engine of FIGS. 1–5.

FIG. 14 is a perspective view, with part broken away of a spacer member employer in the engine of FIGS. 1–4.

FIG. 15 is a horizontal cross sectional view similar to FIG. 8 showing another piston structure.

FIG. 16 and FIG. 18 are perspective views of two other pistons.

FIG. 17 is a bottom plan view of the piston shown in FIG. 16.

FIG. 19 is a bottom plan view of the piston shown in FIG. 18.

FIG. 20 is a perspective view similar to FIG. 10 showing another straight seal or sealing bar structure.

FIG. 21 is a perspective view similar to FIG. 12 showing the seal of FIG. 20 in an inverted position.

FIG. 22 is a side view with part broken away of another spring structure.

FIG. 23 is an enlarged sectional view taken on line 23—23 of FIG. 22.

Figure 2:
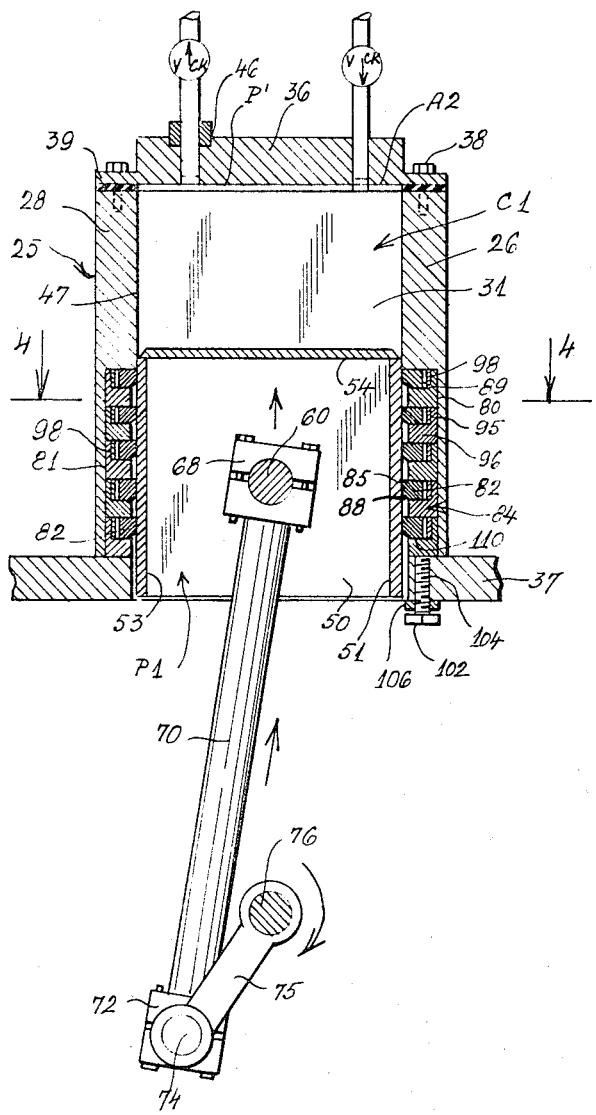
FIG. 2 is a vertical cross sectional view taken on line 2—2 of FIG. 1.
Figure 5:
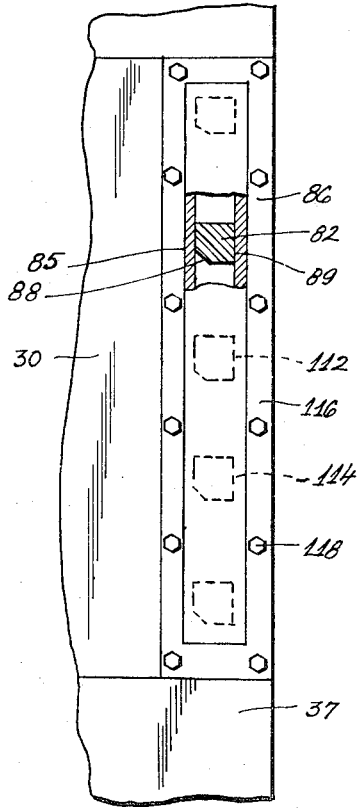
FIG. 5 is a fragmentary enlarged vertical sectional view taken on line 5—5 of FIG. 4.

Referring first to FIGS. 1–4, there is shown an engine 25 which for purposes of illustration only, is arranged to serve as an air compressor. The engine has a pair of spaced vertical walls 26, 28 connected by vertical end walls 29, 30 and cross walls or partitions 31, 32, and 33. Partitions 31, 32 and walls 26, 28 define a rectangular compartment or cylinder C1. Another rectangular compartment C2 is defined by partition 33, end wall 30, and side walls 26, 28. Air chamber A1 is defined by end wall 29, partition 31 and side walls 26, 28. Air chamber A2 is defined by partitions 32, 33 and side walls 26, 28. In compartments C1 and C2 are two vertically movable rectangular pistons P1, P2. In walls 26, 28 are air circulation holes or ports 34, 35 opening into chambers A1, A2. The chamber bottoms are closed by body wall 37.

The top of the engine is closed by a head plate 36 secured by bolts 38 in flanges 39 on upper ends of the side and end walls and sealed by gasket 36′. An air inlet pipe 40 opens into the top of each compartment C1, C2. Each inlet pipe is provided with a one-way check valve 42. Each pipe 40 is secured in an opening in the head plate 36. Each of the compartments C1, C2 also has an outlet pipe 44 with one-way valve 43. The pipe is secured in a bore in the head plate communicating with the top of the compartment.

Each piston P1 and P2 has a box-like structure with open bottom. Each piston is formed by four flat rectangular plates 50–53 and a flat rectangular top plate 54; see FIGS. 1, 2, 4–7. Upper edges 56 of top plate 54 are beveled. The plates 50–54 are secured to each other by welded filleted joints 58, 59. In each piston is a cross pin 60 disposed in holes 62 formed in rectangular mounting plates 64. The plates 64 are held in place on inner sides 50, 52 of the pistons by bolts 65 engaged in threaded blind bores 66; see FIG. 8.

Journaled on each of the pins 60 is a head 68 at the upper end of a piston rod; see FIGS. 2 and 4. The lower end of the piston rod has a head 72 in which is journaled a wrist pin 74. Engaged with each pin 74 is a crank arm 75 secured on drive shaft 76 journaled in bearings (not shown). When the drive shaft rotates the pistons P1, P2 are driven vertically up and down in the rectangular compartments C1, C2. The piston can be phased oppositely as shown in FIG. 3 so that when one piston is in an upper position at the end of a compression stage, the other piston is at a lower position at the start of a compression stage.

Two recesses 80, 81 are formed in opposing inner sides of walls 26, 28 of the engine. In each of these recesses is a plurality of straight sealing bars 82 alternating with spacer bars 84. The structure of each sealing bar 82 is best shown in FIGS. 10–12. Each bar 82 is generally rectangular in cross section with a flat face 85 which abuts one side of the rectangular piston. A beveled corner 88 is provided between faces 85 and 86 to relieve binding and facilitate lubrication of the adjacent side of the piston. The other flat sides 89, 90 of the sealing bar have transverse oil conducting capillary grooves 91 to lubricate the piston. In one end 92 of the bar is a threaded blind bore 93 whose purpose is described below.

Each spacer bar 84 is a right angle bar which is L-shaped in cross section as clearly shown in FIGS. 2 and 14. The spacer bar may have a thicker base or bottom wall 94 and a thinner side wall 95. Two threaded holes 96 are provided at opposite ends of the spacer member in wall 95 to engage screws 97 at flat ends 99 of spring member 98 abutted laterally against the outer flat side 89 of the sealing bar; see FIG. 4. The spring member 98 is best shown in FIG. 13. This member is a leaf spring formed with sinuous corrugations 100. The alternate crests of the corrugations abut the side 89 of the sealing bar. In flat ends 99 are holes 101 which receive screws 97.

Bolts 102 inserted in holes 104 in the body wall 37 of the engine as shown in FIG. 2, are forced against the underside of the bottom spacer bars and are held by locknuts 106. By this arrangement the spacers are abutted to each other in a rigid assembly in each recess 80, 81. Between the walls 94 of adjacent spacers and connecting walls 95 are defined horizontal grooves 110 which are rectangular in cross section and which are open laterally to the opposing sides 51, 53 of the pistons. The spring members 98 press the sealing bars laterally outwardly of the grooves against the piston sides to insure effective hermetic sealing of compartments C1 and C2.

Referring now to FIG. 4, it will be noted that the sealing bars 82 are longer than the side walls 26, 28 of the engine. The bars extend outwardly of the recesses 80, 81 through right end wall 30. The right ends of the bars are enclosed in two rectangular casings 112 closed by end walls 114. The casings have integral rectangular flanges 116 which are secured by removable bolts 118 to the end wall 30 of the engine; see FIG. 3. The left ends of recesses are closed by rectangular plates 120 secured by removable bolts 122 to end wall 29.

In operation of the engine as an air compressor or pump, air will be admitted through inlet pipes 40 to compartments C1, C2 when pistons P1, P2 in these compartments are cyclically drawn down to the position of piston P1 shown in FIGS. 2 and 3. As the pistons are pushed up the compression stage of the cycle begins and the air is compressed in chambers C1 and C2 until at maximum compression compartment the free space in compartment C1 above the piston is reduced to a minimum as shown by piston P2 in FIG. 3. Then valve 43 opens to release compressed air via pipe 44 to a storage tank. As an alternative, engine 25 can be operated as a hydraulic motor to drive shaft 76 when air under pressure is fed through pipes 44 and exhausted through pipes 42 at upper and lower positions respectively of the pistons. The direction of check valves 42, 43 will be reversed.

While the engine is operating the sealing bars 82 are stationary and spring biased against the flat sides of the pistons. The sealing bars can tolerate a considerable amount of wear before resetting or replacement becomes necessary. To reset the sealing bars, flanges 116 carrying casings 112 will be removed from end wall 30 by disengaging bolts 118. Plates 120 will also be removed from end wall 29. A draw bar having a threaded end can be screwed into the bore 93 of each sealing bar in turn and the bar can be pulled longitudinally until the left end of each bar 82 extends outwardly of wall 29. Casings 112 can then be interchanged with plates 120 by mounting flanges 116 on wall 29 while plates 120 are mounted on wall 30. By this resetting of the bars 82, fresh, unworn portions of the bars which were previously exposed in chamber A2 and disposed in casings 112 are located in compartments C1 and C2 respectively. After the newly located parts of the sealing bars are worn, the bars 82 can be removed by sliding them longitudinally out of grooves 110 after casings 112 and plates 120 are again removed. Then new sealing bars can be installed. If necessary, the sealing bars 82 can be reset or replaced while the engine 25 is in operation, since longitudinal resetting movement of the bars or removal and replacement of the bars in turn will not interfere with operation of the pistons. This is a very valuable and important feature of the present invention.

If necessary the spring members 98 can be replaced when casings 112 and plates 120 are removed, by loosening bolts 102 and pushing the spacer bars 84 and spring members 98 out of the recesses 80, 81.

Figure 24:
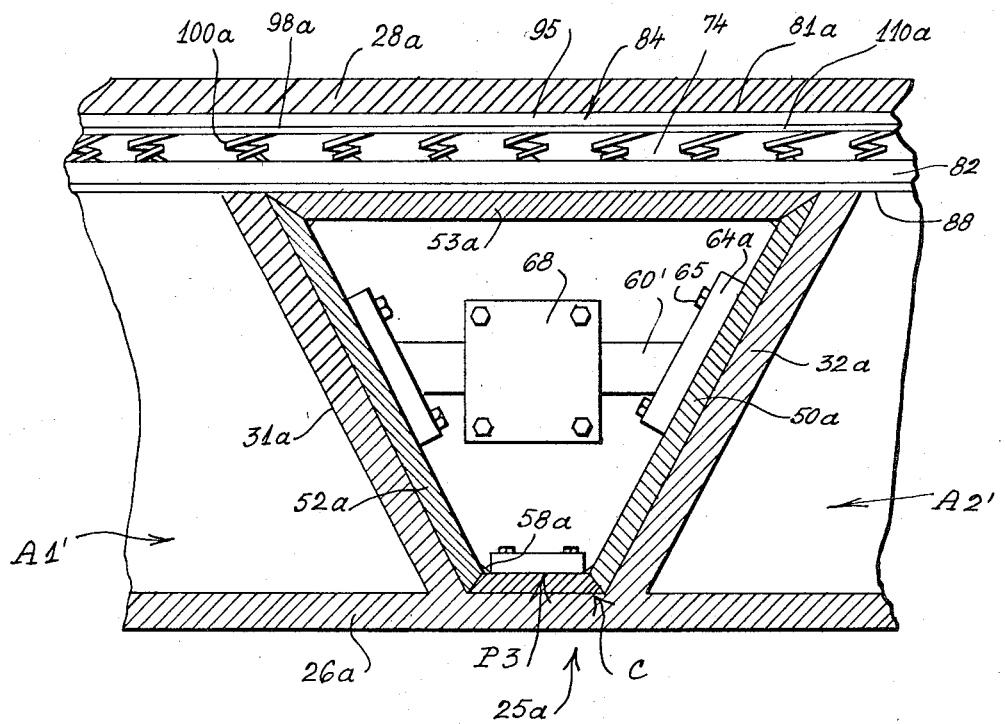
FIG. 24 is an enlarged fragmentary sectional view similar to a part of FIG. 4, showing another engine structure.

In FIG. 24 is shown part of another engine 25a in which parts corresponding to those of engine 25 are identically numbered. In engine 25a, there is shown one piston P3 which is trapezoidal in cross section. This piston as shown in FIGS. 16 and 17 has a trapezoidal flat top wall 54a with beveled edges 56a. This piston has a wider end wall 53a, narrower opposite end wall 51a, and two diagonally disposed side walls 50a, 52a. The piston is made from flat plates joined by corner welds 58a, 59a. A cross pin 60' is mounted between rectangular plates 64a secured by bolts 65 on the side walls 50a, 52a. The side walls 50a, 52a abut partitions 31a, 32a which extend diagonally across the engine between vertical side walls 26a, 28a. The piston moves vertically in a trapezoidal compartment C defined between the partitions 31a, 32a and side walls 26a, 28a. Sealing bars 82 extend along air chambers A1', A2' and compartment C in recess 81a formed in only wall 28a. In each groove 110a defined between adjacent spacers 84 is a spring member 98a integrally formed with struck out coiled spring elements 100a; see FIGS. 20, 21.

Spring member 98a is a long rectangular strip made of spring steel from which the spring elements are struck and drawn. Holes 101' in ends of the spring member receive screws to anchor the spring member to wall 95 of spacer 84.

Engine 25a can be used as an air compressor or pump in the same way as described for engine 25. By the arrangement shown in FIG. 24 only one set of sealing bars 82, one set of spacer bars 84 and one set of spring members 98a need be provided to effect hermetic sealing of the piston to the walls of compartment C.

Figure 25:
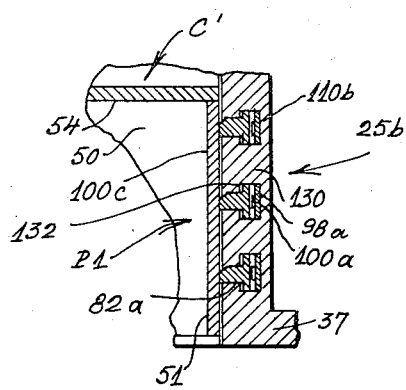
FIG. 25 is a fragmentary enlarged sectional view similar to a part of FIG. 2, showing still another engine structure.

In FIG. 25 is shown part of another engine 25b which is generally similar to engine 25 and corresponding parts are identically numbered. In this engine, spacers 84 are omitted. Instead grooves 110b extend longitudinally through side walls 130 of the engine. The grooves have inner sections 110c of reduced width opening into compartment C' where reciprocatable piston P1 is located. Set in grooves 110b, 110c are sealing bars 82a best shown in FIGS. 20, 21. These bars are formed with flanges 132 at outer face 89a. Bearing against these faces 89a are the coiled spring elements 100a of spring members 98a. The other parts of engine 25b are similar to those of engine 25 already described in detail. Resetting of the sealing bars is accomplished by removing end plates 120 and casings 112 and interchanging them after the sealing bars are moved longitudinally to new positions.

FIG. 15 shows the structure of another piston P4 which is generally similar to piston P1 except that the piston is oblong in cross section rather than square. Side walls 50c, 52c are relatively wider than narrower end walls 51c, 53c; and top plate 54c is correspondingly oblong. Other parts corresponding to those of piston P1 are identically numbered and have corresponding functions already described in connection with piston P1.

FIGS. 18 and 19 show a piston P5 which is triangular in cross section with a triangular top wall 54d and three rectangular side walls 50d, 51d, 52d. The walls are secured together by corner welds 58d, 59d. Other parts corresponding to those of pistons P1–P4 are identically numbered. Pistons P5 can be provided in an engine which will have correspondingly shaped triangular compartments arranged somewhat like compartment C in engine 25a of FIG. 24.

In all forms of engine described and illustrated, the straight sealing bars are resettable and replaceable by longitudinal movement which can be done without interfering with operation of the pistons so that the engines can remain in operation while the sealing bars are rested or replaced. The spring members 98 or 98a can be interchangeably used.

Although FIGS. 6, 15 and 16 show polyhedral pistons which are square, oblong and trapezoidal in cross section, it will be understood that the pistons may have other four-sided cross sectional shapes, such as those of a rhombus, parallelogram or trapezium. The pistons may also have more than four vertical or axially extending sides. In each case the piston will have a polygonal top plate. The cylinder in which the piston works will have the same polyhedral shape as that of the piston.

Since all pistons are flat-sided, hollow polyhedrons they can be manufactured relatively inexpensively from flat stock plates. The welding process used to form integral box-like structures is relatively inexpensive. Thus the polygonal pistons can be manufactured much more cheaply than conventional round cylindrical pistons which require very precise machining to shape them properly.

While I have illustrated and described the preferred embodiments of my invention it is to be understood that I do not limit myself to the precise construction herein disclosed and that various changes and modifications may be made within the scope of the invention as defined in the appended claims.

What is claimed is:

1. An engine comprising a rigid body having a plurality of integrally joined flat exterior walls and flat interior partitions defining a plurality of flat sided compartments, each of said compartments being polygonal in cross section for movably supporting correspondingly shaped pistons, at least one of said flat exterior walls has at least one longitudinally extending recess on its inner side, and a least one straight sealing bar for sealing a side of each piston disposed in said recess, said bar extending longitudinally of said body and crossing all of said compartments, so that the sealing bar can be moved longitudinally into and out of said body without disturbing any piston.

2. An engine as recited in claim 1, further comprising at least one piston in one of said compartments, said piston having a plurality of integrally joined flat plates defining a hollow polyhedron, said piston being polygonal in cross section, one of said flat plates defining a top wall and having a polygonal shape corresponding to the polygonal cross section of the piston, the others of said flat plates being rectangular in form and extending axially of the piston perpendicular to the top wall.

3. An engine as recited in claim 1, further comprising an elongated spring member disposed in said recess between said one exterior wall and said sealing bar to urge the same toward the pistons for sealing the same.

4. An engine as recited in claim 1, wherein said sealing bar is longer than said body and has an end portion extending outwardly of one end of the body, whereby the sealing bar can be moved longitudinally to locate said end portion inside said body for presenting an unworn part of the bar to the piston.

5. An engine as recited in claim 4, further comprising an elongated spring member disposed in said recess between said one exterior wall and said sealing bar to urge the same toward the pistons for sealing the same.

6. An engine as recited in claim 2, wherein said other flat plates are four in number so that the polygonal cross section of the piston is quadrilateral.

7. An engine as recited in claim 2, wherein said other flat plates are three in number so that the polygonal cross section of the piston is triangular.

8. An engine as recited in claim 3, wherein said spring member is a leaf spring formed from a springy strip with sinuous corrugations from end to end thereof.

9. An engine as recited in claim 3, wherein said spring member is a springy strip having a plurality of coil spring elements struck outwardly of one side thereof.

10. An engine as recited in claim 1, wherein said sealing bar has an internally threaded bore at one end for engaging a tool to facilitate moving the bar longitudinally.

11. An engine as recited in claim 1, wherein said sealing bar is generally rectangular in cross section with flat sides, two of said sides being formed with transverse oil conducting grooves.

12. An engine as recited in claim 1, further comprising at least two pistons in two of said compartments respectively, drive means engaging said pistons to move the same in different phase, each of said pistons having a plurality of integrally joined flat plates defining a hollow polyhedron, said piston being polygonal in cross section, one of said flat plates defining a top wall and having a polygonal shape corresponding to the polygonal cross section of the piston, the others of said flat plates being rectangular in form and extending axially of the piston perpendicular to the top wall.

13. An engine as recited in claim 12, further comprising a plurality of straight sealing bars for sealing sides of the pistons disposed in said recess, and spacer members alternating with said bars, said bars extending longitudinally of said body and crossing all of said compartments, so that the sealing bars can be moved longitudinally into and out of said body without disturbing any piston.

14. An engine as recited in claim 13, further comprising a plurality of elongated spring members, each spring member being disposed between one spacer member and one of said bars to urge the bar toward the pistons for sealing the same.

15. An engine as recited in claim 14 wherein each sealing bar is longer than said body and has an end portion extending outwardly of one end of the body, whereby the sealing bars can be moved longitudinally to locate the end portions thereof inside said body for presenting unworn parts of the sealing bars to the pistons.

16. An engine as recited in claim 12, wherein said one of said flat exterior walls has a plurality of longitudinally extending grooves on its inner side, and a plurality of straight sealing bars for sealing sides of the pistons disposed in said grooves respectively, said bars extending longitudinally of said body and crossing all of said compartments so that the sealing bars can be moved longitudinally into and out of said body without disturbing any piston.

17. An engine as recited in claim 16, further comprising a plurality of elongated spring members, each spring member being disposed between said one exterior wall and one of said bars to urge the bar toward the pistons for sealing the same.

18. An engine as recited in claim 17, wherein each sealing bar is longer than said body and has an end portion extending outwardly of one end of the body, whereby the sealing bars can be moved longitudinally to locate the end portions thereof inside said body for presenting unworn parts of the sealing bars to the pistons.

References Cited

UNITED STATES PATENTS

| | | | |
|---|---|---|---|
| 1,529,721 | 3/1925 | Ross | 92—177 XR |
| 1,728,514 | 9/1929 | Snyder | 92—177 XR |
| 1,761,123 | 6/1930 | Gruver | 92—177 XR |
| 1,998,441 | 4/1935 | Campbell | 92—177 XR |
| 2,064,756 | 12/1936 | Janeko | 92—177 XR |
| 2,224,475 | 12/1940 | Evans | 92—177 XR |
| 2,884,290 | 4/1959 | Morrow | 92—177 |
| 2,991,771 | 7/1961 | Caddell | 92—177 |
| 3,068,850 | 12/1962 | Caddell | 123—193 |

WENDELL E. BURNS, *Primary Examiner.*